US012647474B2

(12) United States Patent
Dong et al.

(10) Patent No.: US 12,647,474 B2
(45) Date of Patent: Jun. 2, 2026

(54) FILE SHARING USING SMB

(71) Applicant: Dell Products L.P., Round Rock, TX (US)

(72) Inventors: Helen Hailan Dong, Chengdu (CN); Allen Chaojun Zhao, Chengdu (CN); Yang Zhang, Chengdu (CN); Xuhui Yang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 111 days.

(21) Appl. No.: 18/742,943

(22) Filed: Jun. 13, 2024

(65) Prior Publication Data

US 2025/0330513 A1      Oct. 23, 2025

(30) Foreign Application Priority Data

Apr. 19, 2024     (CN) .......................... 202410479404.7

(51) Int. Cl.
| | |
|---|---|
| *G06F 15/16* | (2006.01) |
| *G06F 16/176* | (2019.01) |
| *H04L 67/06* | (2022.01) |
| *H04L 67/1097* | (2022.01) |

(52) U.S. Cl.
CPC ........... *H04L 67/06* (2013.01); *G06F 16/176* (2019.01); *H04L 67/1097* (2013.01)

(58) Field of Classification Search
CPC .................................................... G06F 16/176
See application file for complete search history.

(56) References Cited

U.S. PATENT DOCUMENTS

| | | | | |
|---|---|---|---|---|
| 2013/0254492 A1* | 9/2013 | George | ............... | G06F 21/6218 |
| | | | | 711/141 |
| 2015/0200817 A1* | 7/2015 | Mulchandani | ........ | H04L 67/142 |
| | | | | 709/223 |
| 2021/0120004 A1* | 4/2021 | Zhao | ..................... | H04L 67/568 |

\* cited by examiner

*Primary Examiner* — Yves Dalencourt
(74) *Attorney, Agent, or Firm* — Amin, Turocy & Watson, LLP

(57) ABSTRACT

The subject technology relates to a Server Message Block (SMB). For instance, an example method includes determining a break rate of a file serving as an object of an SMB lease in the SMB lease process, and determining a turning point of the break rate, wherein the turning point indicates a critical point between enabling the SMB lease and disabling the SMB lease. The method further includes determining to enable or disable the SMB lease based on the break rate and the turning point. According to the example technologies used for an SMB, the overall input/output (IO) performance of a system can be improved.

20 Claims, 4 Drawing Sheets

200

210

Determine a break rate of a file serving as an object of an SMB lease in the SMB lease process

220

Determine a turning point of the break rate, wherein the turning point indicates a critical point between enabling the SMB lease and disabling the SMB lease

230

Determine to enable or disable the SMB lease based on the break rate and the turning point

300

FILE SHARING USING SMB

RELATED APPLICATION

The present application claims the benefit of priority to Chinese Patent Application No. 202410479404.7, filed on Apr. 19, 2024, which application is hereby incorporated into the present application by reference herein in its entirety.

TECHNICAL FIELD

The subject technology relates to the field of file sharing, and, e.g., to a Server Message Block (SMB).

BACKGROUND

SMB is a client/server, request/response protocol. The 2.0 version of the protocol, that is, SMB2.0, is also referred to as SMB2 in brief. Through the SMB protocol, a client application can access a file on a server, and the process is also referred to as SMB lease. During the SMB/SMB2 lease, a client may locally cache file data from the server, which can reduce network throughput and improve the client request performance. However, if a plurality of clients accesses the same file simultaneously, access conflicts for the same file may increase, and SMB break may occur. If an SMB break ratio is too high, the request performance of the client may decrease, and it may even be worse compared with a case in which the SMB lease is not enabled.

SUMMARY

Example embodiments of the present disclosure provide a method, a device, and a computer program product used for an SMB. Specifically, one or more example embodiments of the present disclosure provide a method, and the method, by using a mechanism of analyzing a file client mapping state and a client input/output (IO: Input & Output) load distribution state, analyzes an SMB lease efficiency, and assists a Network Attached Storage (NAS) server to make an optimized decision of enabling or not enabling (or referred to as disabling) the SMB lease for a file, thereby improving the file access performance.

According to one example embodiment of the present disclosure, a method used for SMB lease is provided. The method includes: determining a break rate of a file serving as an object of an SMB lease in the SMB lease process, determining a turning point of the break rate, wherein the turning point indicates a critical point between enabling the SMB lease and disabling the SMB lease, and determining to enable or disable the SMB lease based on the break rate and the turning point.

According to another example embodiment of the present disclosure, an electronic device is provided. The electronic device includes: a processing unit, and a memory, coupled to the processing unit and storing instructions, wherein the instructions, when executed by the processing unit, perform the following actions: determining a break rate of a file serving as an object of an SMB lease in the SMB lease process, determining a turning point of the break rate, wherein the turning point indicates a critical point between enabling the SMB lease and disabling the SMB lease, and determining to enable or disable the SMB lease based on the break rate and the turning point.

According to still another example embodiment of the present disclosure, a computer program product is provided. The computer program product is tangibly stored on a non-transient computer readable medium and includes computer executable instructions, wherein the computer executable instructions, when executed, cause a computer to perform the following operations: determining a break rate of a file serving as an object of an SMB lease in the SMB lease process, determining a turning point of the break rate, wherein the turning point indicates a critical point between enabling the SMB lease and disabling the SMB lease, and determining to enable or disable the SMB lease based on the break rate and the turning point.

This Summary is provided to introduce relevant concepts in a simplified manner, and these concepts will be further described in the Detailed Description below. This Summary is neither intended to identify key features or essential features of the present disclosure, nor intended to limit the scope of the embodiments of the present disclosure.

BRIEF DESCRIPTION OF THE DRAWINGS

By description of exemplary embodiments of the present disclosure in more detail with reference to the accompanying drawings, the above and other objects, features, and advantages of the present disclosure will become more apparent. In the exemplary embodiments of the present disclosure, the same reference numerals generally represent the same elements.

DETAILED DESCRIPTION

Figure 1A:
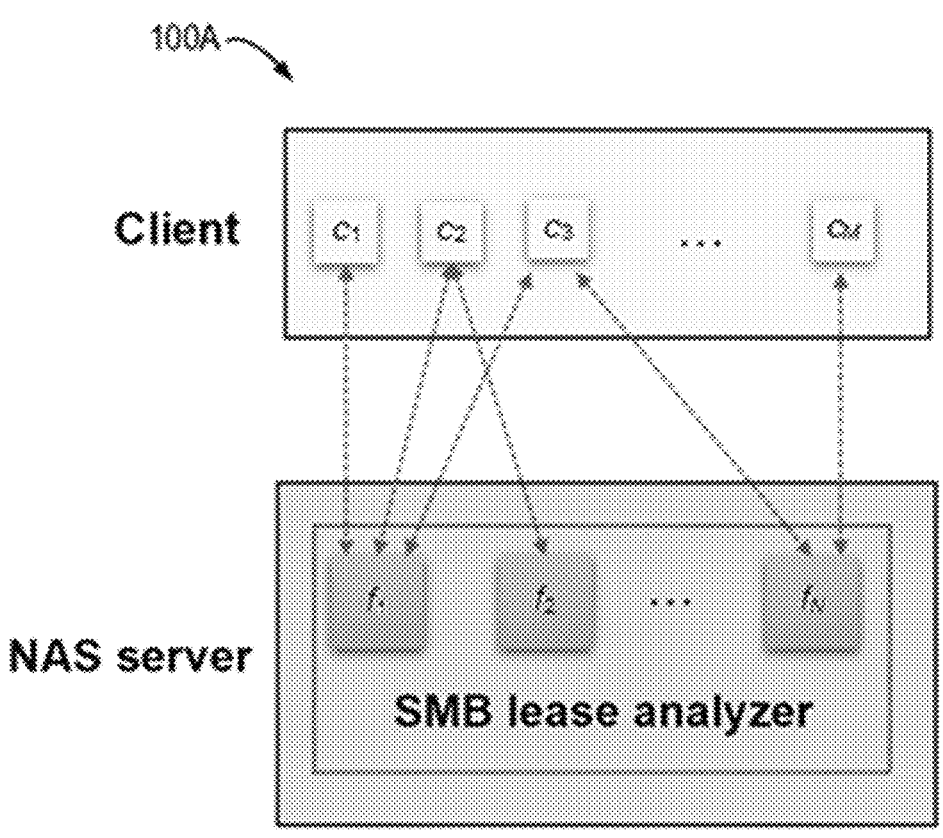
FIG. 1A shows a schematic SMB lease analyzer according to an embodiment of the present disclosure.

Example embodiments of the present disclosure will be described in more detail below with reference to the accompanying drawings. Although some specific embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and can fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless it is clearly stated that the terms refer to different objects.

The following embodiments are examples. Although the specification may mention "an," "one," or "some" embodiments in some places, this does not necessarily mean that every such mention refers to the same embodiment, or that the feature only applies to a single embodiment. Individual features of different embodiments may also be combined to provide other embodiments. Furthermore, the words "including" and "containing" should be understood as not making a limitation that the embodiment is composed of only those features that have been mentioned, and such an embodiment may also include features/structures that have not been specifically mentioned.

The development of network communication technologies has promoted sharing of network resources. For example, in a network environment, files can be stored on servers, and various clients access, through the network, these files stored on the servers. The Server Message Block (SMB) protocol can provide relevant functions and mechanisms for local area network users to ensure transmission reliability. At present, in order to address issues such as network stability, as well as fairness, congestion control, and efficiency of data flow during bandwidth sharing, the vast majority of data packets in local area networks are transmitted through the SMB protocol. The SMB protocol is also widely used for file sharing in network environments. When the SMB protocol is used for file sharing, it is also referred to as SMB lease. The SMB lease is a file lease that provides exclusive write and delete access privileges to files. The SMB lease allows clients to locally cache file data from storage servers to improve the IO performance and reduce the network traffic. For example, if a client confirms that no other clients are accessing data, the client may temporarily not need to write information to a file on a remote server.

When the client intends to open a file, it may request a server to grant it a lease on the file. As a response to the request, the server may grant a lease on the file to the client. This type of lease may be considered as a privilege or permission, that is, granting the privilege of accessing (reading/writing) the file to the client, or permitting the client to access (read/write) the file. If receiving the response, the client may know that it has been granted a lease on the file by the server. Then, the client may use the lease granted by the server to adjust its buffering strategy. The lease may span a plurality of opens (a plurality of file opening operations) and a plurality of connections from the same client.

If a certain client (for example, labeled a "client 1") has been granted a lease on a certain file by a server, at this time, when another client (for example, labeled a "client 2") requests to open the file from the server again (that is, when the client 2 requests a lease on the same file), the file open request may conflict with the current lease of the client 1 on the file. Once a conflict occurs, the server may break the current lease of the client 1. If there is a data update to the file locally cached in the client 1 for the current lease, the client 1 needs to first refresh locally cached content to the server before breaking the lease on the file, and the refreshing operation may be time-consuming. In this way, during the lease period of the client 1, the client 2 requests to lease the same file, causing a break of the current lease of the client 1. At the same time, it also increases the time consumption from the client 2 issuing a file open request to the lease being granted. Therefore, in this case, the file open request of the client 2 may lead to a decrease in the system IO performance.

As mentioned above, for a file connected to a plurality of clients, enabling an SMB lease for one client may result in a lease break for another client (for example, in the above example, enabling an SMB lease for the client 2 may result in a lease break for the client 1), and frequent lease breaks may lead to a low IO efficiency, resulting in the IO performance even lower than that when the SMB lease is not enabled. On the other hand, even if a switch for enabling or disabling an SMB lease function on a NAS server is provided on the storage system for the client, it is difficult for the client to figure out and decide under what situation the function should be enabled/disabled. In addition, changing the SMB lease protocol based on business changes in the file is also quite cumbersome.

In view of this, according to the present disclosure, a method, a device, and a computer program product used for an SMB are provided. Specifically, in some embodiments, a method used for an SMB is provided. The method includes determining a break rate of a file serving as an object of an SMB lease in the SMB lease process, and determining a turning point of the break rate, wherein the turning point indicates a critical point between enabling the SMB lease and disabling the SMB lease. The method further includes determining to enable or disable the SMB lease based on the break rate and the turning point.

Through such technical idea and method, the present disclosure provides a method, a device, and a computer program product used for an SMB, thereby improving the overall IO performance of the system.

Basic principles and several example embodiments of the present disclosure are described below with reference to FIG. 1 to FIG. 4. It should be understood that these example embodiments are provided merely to enable those skilled in the art to better understand and then implement the embodiments of the present disclosure, and are not intended to impose any limitation to the scope of the present disclosure.

For example, a service may be implemented in a NAS server to analyze the SMB lease efficiency, as shown in FIG. 1A. FIG. 1A shows a schematic SMB lease analyzer according to an embodiment of the present disclosure. The SMB lease analyzer can analyze a mapping state of files and clients and a distribution state of client IO loads, and further determine whether enabling an SMB lease file can bring a higher performance: if not, the NAS server may not enable the SMB lease; and if so, the NAS server may enable the SMB lease. The specific processing process may be described in detail later with reference to FIG. 3.

Some embodiments of the present disclosure provide a method for calculating an SMB lease break rate. For example, the SMB lease break rate may be calculated in both cases of enabling the SMB lease and disabling the SMB lease (hereinafter, the "SMB lease break rate" is also referred to as the "SMB break rate" or "break rate" in brief). A method for estimating (/calculating) the SMB lease break rate is provided in combination of a plurality of factors (such as the number of clients mapped to a file and the degree of IO load distribution) for the case where SMB lease is disabled. Some embodiments of the present disclosure further involve guiding a NAS to make a file SMB lease decision. For example, a break probability threshold may be calculated in combination with the time consumption caused by SMB lease breaks. Once the break rate is higher than the threshold, for the overall IO performance of the storage system, the efficiency with the SMB lease enabled may be lower than that with the SMB lease not enabled (that is, disabled). In other words, in this case (that is, when the break rate is higher than the threshold), the SMB lease is disabled to improve the overall IO performance of the system. On the contrary, if the break rate is lower than the threshold, enabling the SMB lease can improve the overall IO performance of the system. In this way, the file access performance of the storage system can be improved.

For the calculation of the SMB lease break rate, assuming that there are K NAS servers on the storage system, with N files on each NAS server k, wherein $1<i\leq N$, and $1<k\leq K$. For each of the N files, as mentioned above, the SMB lease break rate may be calculated through 2 scenarios. The SMB lease is enabled for the files in the scenario 1; and the SMB lease is not enabled for the files in the scenario 2. Then, the break rate after enabling the SMB lease is estimated for the 2 scenarios.

In the scenario 1, the break rate is calculated in a case of using the SMB lease. For example, assuming that a monitoring period is T, the SMB lease break rate $R_{i\_break}$ may be directly calculated by the number of hits on the IO break $IO_{break}$ and the total number of IOs $f_{i\_io}$ on the file during the period T.

$$R_{i\_break} = \frac{IO_{break}}{f_{i\_io}} \qquad \text{(Formula 1)}$$

In the scenario 2, no actual SMB lease has occurred, and therefore, the break rate may be estimated (or calculated) according to a plurality of factors. Specifically, for example, for a file $f_i$, what the SMB break rate may be is evaluated once the SMB lease is enabled. The estimation of the break rate may be in accordance with various factors, such as the number of clients mapped to the file and the distribution of IO loads from clients. It is assumed that the number of clients mapped to each file $f_i$ is J, $1<j\leq J$, and the number of clients connected to the file $f_i$ is $C_{i,j}$, wherein $$C_i = [C_{i,1}, C_{i,2}, C_{i,3}, \dots C_{i,J}] \qquad \text{(Formula 2)}$$

The number of IO accesses for the client j to the file $f_i$ is $CIO_{i,j}$, wherein $$CIO_i = [CIO_{i,1}, CIO_{i,2}, \dots CIO_{i,J}] \qquad \text{(Formula 3)}$$

Figure 1B:
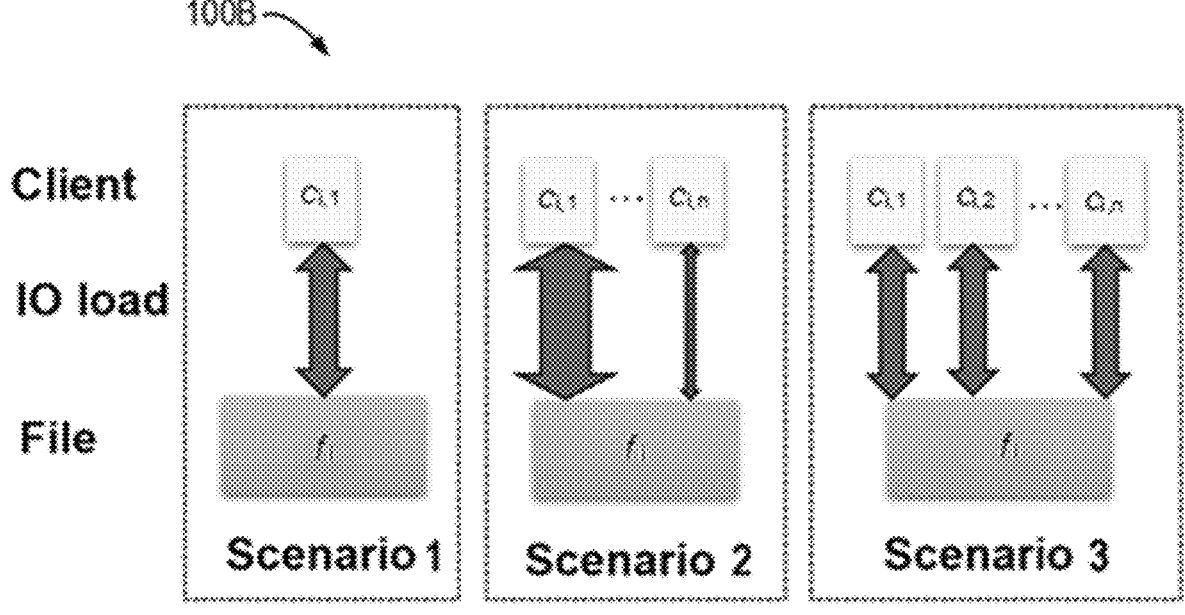
FIG. 1B shows a schematic distribution scenario of files and clients and IO loads according to an embodiment of the present disclosure.

The distribution scenario of clients and IO loads may be summarized as shown in FIG. 1B. FIG. 1B shows a schematic distribution scenario 100B of files and clients and IO loads according to an embodiment of the present disclosure. As shown in FIG. 1B, in a scenario 1, only 1 client accesses a file $f_i$, and therefore, there may be no SMB break, that is, the break rate $R_{i\_break}=0$.

In a scenario 2, there are a plurality of clients accessing the file $f_i$ simultaneously, but most of the IO loads come from 1 client (the first client in FIG. 1B), so the SMB break rate is also very low.

In a scenario 3, there are a plurality of clients accessing the file $f_i$ simultaneously and the IO loads uniformly come from the plurality of clients, and therefore, the SMB break rate is higher.

A quantitative analysis is performed on the SMB break rate below. Assuming that the total IO volume of the file $f_i$ is $f_{i\_io}$, and the average IO load $f_{i\_average}$ on the client for the file $f_i$ may be calculated as follows:

$$f_{i\_average} = \frac{f_{i\_io}}{J} \qquad \text{(Formula 4)}$$

For the IO distribution state of the file $f_i$, a standard deviation of $CIO_i$ is calculated as $\sigma_i$:

$$\sigma_i = \sqrt{\frac{\sum_{j=1}^{j=J}(CIO_{i,j} - f_{i\_average})^2}{j}} \qquad \text{(Formula 5)}$$

wherein an imbalance ratio of IO load distribution of the clients is:

$$\beta_i = \frac{\sigma_i}{f_{i\_average}} \quad (0 \leq \beta_i \leq 1) \qquad \text{(Formula 6)}$$

wherein when the value of $\beta_i$ is smaller (that is, the imbalance ratio is lower), it indicates that the IO of the file $f_i$ comes uniformly from a plurality of clients $C_{i,j}$, resulting in a higher break rate, as mentioned above. On the contrary, when the value of $\beta_i$ is larger (that is, the imbalance ratio is higher), it indicates that the IO of the file $f_i$ does not uniformly come from a plurality of clients $C_{i,j}$, and the break rate is lower.

Therefore, the SMB lease break rate may be estimated by combining the number of clients mapped to file $f_i$ and the IO load distribution of clients, for example, it may be set as:

$$R_{i\_break} = \frac{J-1}{J} * (1 - \beta_i) \qquad \text{(Formula 7)}$$

According to the above Formula 7 (also referred to as a "Calculation formula 2" in the present disclosure), when the number of clients J is 1 (that is, in the scenario 1 above), the break rate $R_{i\_break}$ is 0 (that is, SMB break may not occur in this situation). When J is not 1 (that is there are a plurality of clients) and $\beta_i$ is larger (that is, there is a high degree of non-uniformity of loads from J clients, that is, the scenario 2 above), the SMB break rate is also very low. When J is not 1 (that is, there are a plurality of clients) and $\beta_i$ is smaller (that is, there is a high degree of uniformity of loads from J clients, that is, the scenario 3 above), the SMB break rate may be higher.

The SMB lease can improve the file access efficiency. However, when the break rate is too high, the file access efficiency may be lower than that when the SMB lease is not enabled (that is, disabled). Therefore, a break rate threshold with the SMB enabled is calculated to be lower than a threshold with the SMB lease disabled. A turning point (also referred to as an "inflection point") for disabling or enabling SMB lease depends on the time consumption of lease breaks. Specifically, if the break rate is too high and the time consumption is too long, disabling the lease can improve the file access performance. On the contrary, if the host IO access situation changes (for example, a decrease in the number of hosts mapped to a file, or an imbalance in IO loads on the file), enabling the lease can improve the file access performance.

In the following embodiments, the break rate threshold is calculated based on relevant parameters of the file $f_i$. In some embodiments, it is assumed that the SMB lease is not enabled for the file $f_i$, the time consumption from the client issuing the request to the NAS server receiving the request is the same as the time consumption from the NAS server issuing a response acknowledgement (ACK) (that is, issuing a grant of a lease on the file to the client) to the client receiving the response ACK, and the time consumption of a one-way request is t. That is, the time consumption for the client to request access to a file (such as the above file $f_i$)

from the NAS server is t, and the time consumption for the NAS server to respond the ACK to the client is also t. In other words, that is, the time from the client issuing a request to the NAS server receiving the request is t, and the time from the NAS server issuing the response ACK to the client receiving the response ACK is also t. In addition, a duration of SMB lease timeout is set as $t_l$. That is, after the NAS server receives an access request for a file from the client, if the NAS server does not issue a response ACK for a period of time longer than $t_l$, it may issue a negative acknowledgement (NACK) to the client (that is, issuing to the client that a lease on the file is not granted). Then, the IO time consumption on the file may be calculated based on this. In this case, the client acquires the file from the NAS server during each IO with a time consumption of 2 t. Then, the total time consumption for the file requests is: $t_{wo}=f_{i\_io}*2t$, wherein $f_{i\_io}$ represents the total IO volume for the file $f_i$ within a predetermined time period T (T>t).

In other embodiments, it is assumed that the SMB lease is enabled for the file $f_i$. In this case, by enabling the SMB lease on the file $f_i$, the IO load may be classified into $t_{wo}$ categories: IO that misses the SMB lease break and IO that hits the SMB lease break. For a non-break IO access, $f_{i\_io\_wob}=f_{i\_io}*(1-R_{i\_break})$, the average IOPS (IO operations per second) is $f_{i\_iops}$, the time consumption for the client to acquire the file is t, and the time consumption of each IO is $$\frac{2t}{t_l * f_{i\_iops}}.$$

Therefore, the total time consumption for non-break IO accesses is:

$$t_{w\_wob} = f_{i\_io} * (1 - R_{i\_break}) * \frac{2t}{t_l * f_{i\_iops}} \qquad \text{(Formula 8)}$$

For those IO accesses that hit SMB lease breaks, $f_{i\_io\_wb}=f_{i\_io}*R_{i\_break}$, and the total time consumption for the client to acquire a file is 4t, and therefore:

$$t_{w\_wb} = f_{i\_io} * R_{i\_break} * 4t \qquad \text{(Formula 9)}$$

If $(t_{w\_wob}+t_{w\_wb})=t_{wo}$, the SMB break rate has reached the turning point, and disabling the SMB lease can improve the performance, wherein $R_{i\_tp}$ may be calculated through the following formula:

$$R_{i\_tp} = \frac{2t * f_{i\_io} * t_l * f_{i\_iops} - 2t * f_{i\_io}}{4t * f_{i\_io} * t_l * f_{i\_iops} - 2t * f_{i\_io}} \qquad \text{(Formula 10)}$$

After the SMB lease break rate $R_{i\_break}$ and its turning point $R_{i\_tp}$ are obtained, it is able to ultimately decide whether to enable the SMB lease accordingly, so as to improve the IO performance. For example, if $R_{i\_break}>R_{i\_tp}$, the SMB lease needs to be disabled to improve the IO performance.

Figure 2:
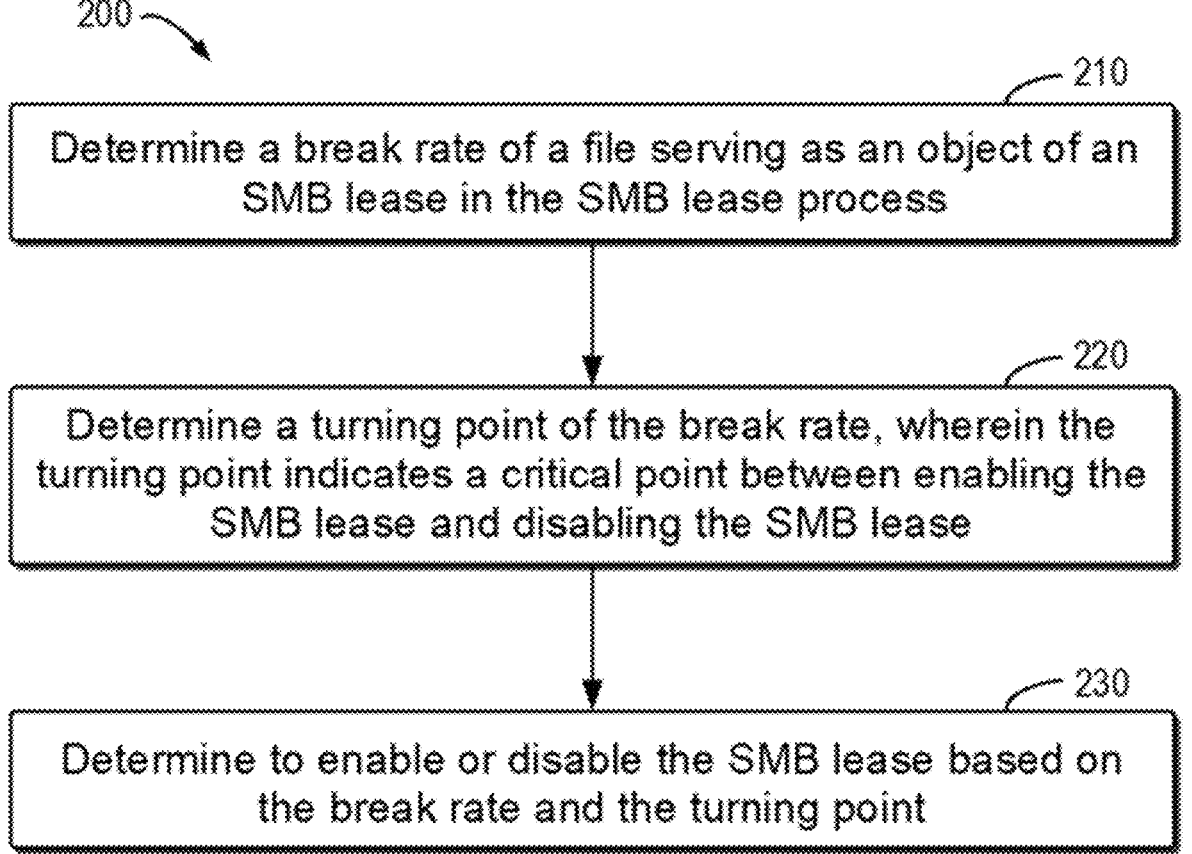
FIG. 2 shows a flowchart of a method used for SMB lease according to an embodiment of the present disclosure.

FIG. 2 shows a flowchart of an example method 200 used for an SMB according to an embodiment of the present disclosure. As shown in FIG. 2, in the example method 200, in 210, a break rate of a file (such as the file $f_i$ in the previous example) serving as an object of an SMB lease is determined in the SMB lease process. For example, the break rate may be calculated based on whether the SMB lease is enabled or not. In some embodiments, a load state of the file may be monitored based on the SMB lease being enabled, and the break rate may be determined based on the load state. The load state of the file includes the total number of inputs and outputs for the file within a predetermined time interval (for example, the time period T), as well as the number of breaks of the inputs and outputs of the file within the predetermined time interval. Alternatively, in other embodiments, the number of clients mapped to the file and the load state of the file may be monitored based on the SMB lease not being enabled (that is, disabled), and the break rate may be determined based on the number of clients and the load state. The number of clients mapped to the file includes the number of clients connected to the file, and the load state of the file includes an average number of Input/Output Operations Per Second (IOPS) on the file within the predetermined time interval (for example, the time period T). The load of the file may uniformly come from clients at the number of clients.

In 320, a turning point of the break rate is determined, wherein the turning point indicates a critical point between enabling the SMB lease and disabling the SMB lease. In other words, at the turning point, the time consumption for accessing the file with the SMB lease enabled is equal to the time consumption for accessing the file with the SMB lease disabled. That is, once the break rate exceeds the turning point, enabling the SMB lease may not help improve the system IO performance, but instead may result in lower system IO performance than that when the SMB lease is disabled. In some embodiments, to determine the turning point of the break rate, a first total time consumption for acquiring the file without utilizing the SMB lease may be calculated, and a second total time consumption for acquiring the file utilizing the SMB lease may be calculated. Then, the turning point is determined by assuming that the first total time consumption is equal to the second total time consumption.

In 330, it is determined to enable or disable the SMB lease based on the break rate and the turning point. For example, in some embodiments, it may be determined to disable the SMB lease based on the break rate being greater than the turning point. In other embodiments, it may be determined to enable the SMB lease based on the break rate being less than the turning point. In other embodiments, the current SMB lease situation may not be changed based on the break rate being equal to the turning point. For example, if the SMB lease is currently enabled and the break rate is equal to the turning point, enabling the SMB lease may be maintained and is not changed to disabling the SMB lease. If the SMB lease is currently disabled and the break rate is equal to the turning point, disabling the SMB lease is maintained and is not changed to enabling the SMB lease. Alternatively, in other embodiments, it may be determined to disable the SMB lease based on the break rate being greater than or equal to the turning point. Alternatively, in other embodiments, it may be determined to enable the SMB lease based on the break rate being less than or equal to the turning point.

Figure 3:
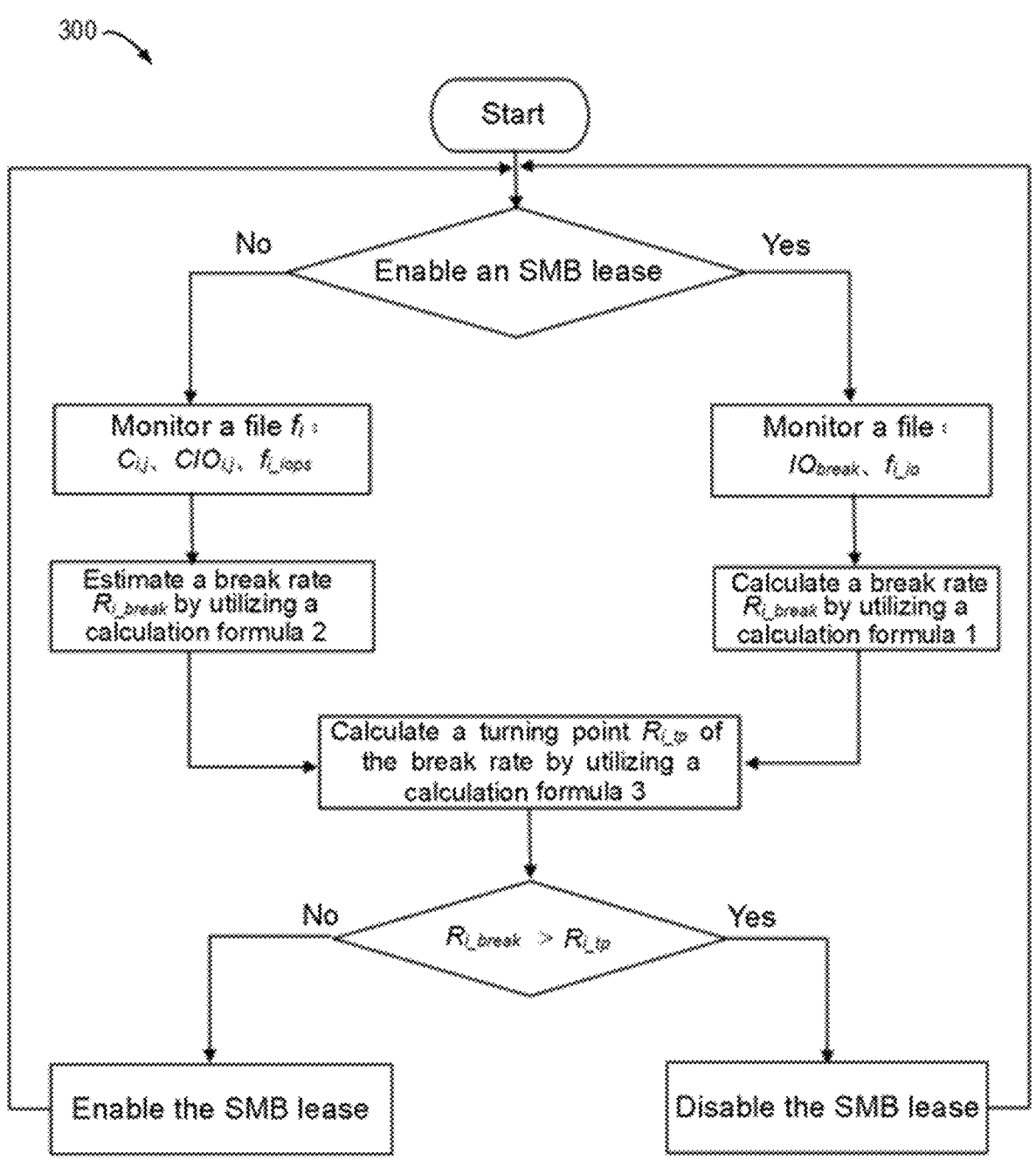
FIG. 3 shows a schematic diagram of a process used for SMB lease analysis according to an embodiment of the present disclosure.

FIG. 3 shows a schematic diagram of a process 300 used for SMB lease analysis according to an embodiment of the present disclosure.

As shown in FIG. 3, at 305, the process 300 starts. Then, at 310, it is determined whether an SMB lease has been enabled. If not (310: N, that is, in a case that the SMB lease is not enabled (that is, disabled), at 315, the following parameters of the file $f_i$ are monitored: the number of clients $C_{i,j}$ connected to the file $f_i$, the IO access volume $CIO_{i,j}$ of the client j to the file $f_i$, and the average input/output operations per second $f_{i\_iops}$ to the file $f_i$ during the time period T. At 320, a first break rate $R_{i\_break1}$ is estimated (/calculated) by using the above Formula 7.

If the SMB lease is enabled, that is, if at 310, it is determined as yes (310: Y), at 325, the following parameters of the file $f_i$ are monitored: the number of IO breaks $IO_{break}$ that are hit during T and the total number of IOs $f_{i\_io}$ on the file during T. At 330, a second break rate $R_{i\_break2}$ is calculated by utilizing the above Formula 1 (also referred to as a "calculation formula 1" in the present disclosure).

Then, at 335, by utilizing the first break rate $R_{i\_break1}$ estimated at 320 and the second break rate $R_{i\_break2}$ calculated at 330, a turning point $R_{i\_tp}$ of the break rate $R_{i\_break}$ is calculated by utilizing the above Formula 10 (also referred to as a "calculation formula 3" in the present disclosure).

Then, at 340, it is determined whether the current break rate $R_{i\_break}>$ the turning point $R_{i\_tp}$. If no (340: N), the SMB lease is enabled at 345. If yes (340: Y), the SMB lease is disabled at 350.

Figure 4:
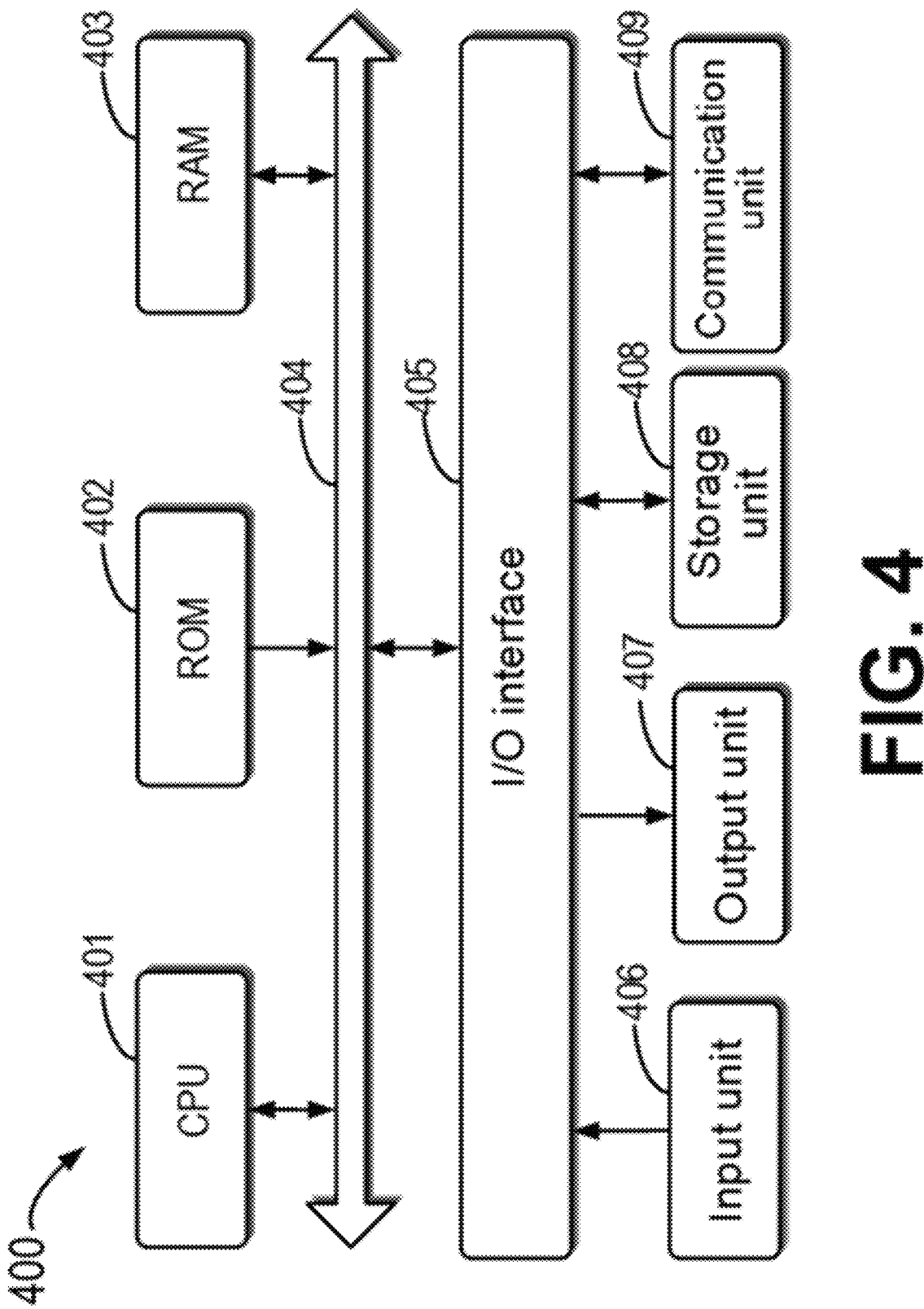
FIG. 4 shows a schematic block diagram of a device that can be used for implementing embodiments of the present disclosure.

FIG. 4 shows a schematic block diagram of a device 400 that may be used to implement embodiments of the present disclosure. The device 400 may be a device, an apparatus, or a system described in the embodiments of the present disclosure. For example, the device 400 may be any hardware that is used for implementing the method according to the present disclosure, such as a server and a device (such as a terminal device). As shown in FIG. 4, the device 400 includes a central processing unit (CPU) 401 which may perform various appropriate actions and processing according to computer program instructions stored in a read-only memory (ROM) 402 or computer program instructions loaded from a storage unit 408 to a random access memory (RAM) 403. The RAM 403 may further store various programs and data required by operations of the device 400. The CPU 401, the ROM 402, and the RAM 403 are connected to each other through a bus 404. An input/output (I/O) interface 405 is also connected to the bus 404.

A plurality of components in the device 400 are connected to the I/O interface 405, including: an input unit 406, such as a keyboard and a mouse; an output unit 407, such as various types of displays and speakers; the storage unit 408, such as a magnetic disk and an optical disc; and a communication unit 409, such as a network card, a modem, or a wireless communication transceiver. The communication unit 409 allows the device 400 to exchange information/data with other devices through a computer network such as the Internet and/or various telecommunication networks.

The various methods or processes described above may be performed by the processing unit 401. For example, in some embodiments, the method may be embodied as a computer software program that is tangibly included in a machine-readable medium, such as the storage unit 408. For example, in some embodiments, the method of the present disclosure may be embodied as a computer software program that is tangibly included in a machine-readable medium, such as the storage unit 408. In some embodiments, part of or all the computer program may be loaded and/or installed onto the device 400 via the ROM 402 and/or the communication unit 409. When the computer program is loaded into the RAM 403 and executed by the CPU 401, one or more steps or actions of the methods or processes described above may be executed.

As mentioned above, a novel method for SMB is proposed in the present disclosure. According to the method, a break rate of a file serving as an object of an SMB lease in the SMB lease process is determined first, and a turning point of the break rate is determined, wherein the turning point indicates a critical point between enabling the SMB lease and disabling the SMB lease. Then, it is determined to enable or disable the SMB lease based on the break rate and the turning point. Specifically, in some embodiments, the SMB lease is enabled only when the break rate is less than the turning point, and the SMB lease is disabled when the break rate is greater than the turning point. In this way, the overall IO performance of the system can be improved.

In some embodiments, the methods and processes described above may be implemented as a computer program product. The computer program product may include a computer-readable storage medium on which computer-readable program instructions for performing various embodiments of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks (including a local area network (LAN) or a wide area network (WAN)) or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various embodiments of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various functions/actions specified in one or more blocks in the flowcharts and/or block diagrams.

The computer-readable program instructions can be loaded onto a computer, other programmable data processing apparatuses, or other devices, so that a series of operating steps are performed on the computer, other programmable data processing apparatuses, or other devices to produce a computer-implemented process. Therefore, the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functions, and operations of possible implementations of the device, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions denoted in the blocks may also occur in an order different from that shown in the drawings. For example, $t_{wo}$ consecutive blocks may in fact be executed substantially concurrently, and sometimes they may also be executed in a reverse order, depending on the functions involved. It should be further noted that each block in the block diagrams and/or flowcharts as well as a combination of blocks in the block diagrams and/or flowcharts may be implemented by a dedicated hardware-based system executing specified functions or actions, or by a combination of a dedicated hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed herein.

What is claimed is:

1. A method, comprising:

determining, by a system comprising at least one processor, a break rate of a file serving as an object of a Server Message Block (SMB) lease in an SMB lease process;

determining, by the system, a turning point of the break rate, wherein the turning point indicates a critical point between enabling the SMB lease and disabling the SMB lease; and determining, by the system, to enable or disable the SMB lease based on the break rate and the turning point, wherein determining the turning point of the break rate comprises:

determining a first total time consumption for acquisition of the file when not utilizing the SMB lease;

determining a second total time consumption for acquisition of the file when utilizing the SMB lease; and determining the turning point as a function of the first total time consumption being equal to the second total time consumption.

2. The method according to claim 1, further comprising:

determining, by the system, whether the SMB lease has been enabled for the file, wherein determining the break rate comprises:

determining the break rate based on a result of the determining whether the SMB lease has been enabled.

3. The method according to claim 2, wherein determining whether the SMB lease has been enabled for the file comprises determining that the SMB lease is enabled for the file, and wherein determining the break rate comprises:

monitoring a load state of the file based on the SMB lease having been determined to be enabled, wherein determining the break rate comprises determining the break rate based on the load state.

4. The method according to claim 3, wherein the load state of the file comprises a total number of inputs and outputs for the file within a defined time interval, and a number of breaks of the inputs and outputs of the file.

5. The method according to claim 2, wherein determining whether the SMB lease has been enabled for the file comprises determining that the SMB lease is not enabled for the file, and wherein determining the break rate comprises:

monitoring, based on the SMB lease having been determined not to be enabled, a number of clients mapped to the file and a load state of the file; and determining the break rate based on the number of clients and the load state.

6. The method according to claim 5, wherein the number of clients mapped to the file comprises the number of clients connected to the file, and the load state of the file comprises an average number of input/output operations per second on the file within a defined time interval.

7. The method according to claim 5, wherein the number of clients mapped to the file further comprises the number of clients connected to the file and the number of clients currently attempting to connect to the file.

8. The method according to claim 5, wherein the load state of the file results from a same load by each of the clients of the number of clients.

9. The method according to claim 1, wherein determining to enable or disable the SMB lease based on the break rate and the turning point comprises:

determining to disable the SMB lease based on the break rate being greater than or equal to the turning point, or determining to enable the SMB lease based on the break rate being less than the turning point.

10. A device, comprising:

at least one processing unit; and at least one memory, coupled to the at least one processing unit and storing instructions, wherein the instructions, when executed by the at least one processing unit, perform:

a determination of a break rate of a file serving as an object of a Server Message Block (SMB) lease in an SMB lease process;

a determination of a turning point of the break rate, wherein the turning point indicates a critical point between enabling the SMB lease and disabling the SMB lease; and a determination of whether to enable or disable the SMB lease based on the break rate and the turning point, wherein the determination of whether to enable or disable the SMB lease based on the break rate and the turning point comprises:

a determination to disable the SMB lease based on the break rate being greater than or equal to the turning point, or a determination to enable the SMB lease based on the break rate being less than the turning point.

11. The device according to claim 10, wherein the instructions, when executed by the at least one processing unit, further perform:

a determination of whether the SMB lease has been enabled for the file, wherein the determination of the break rate comprises:

the determination of the break rate based on whether the SMB lease is enabled.

12. The device according to claim 11, wherein the determination of the break rate comprises:

a monitoring of a load state of the file based on the SMB lease being determined to be enabled; and the determination of the break rate based on the load state.

13. The device according to claim 12, wherein the load state of the file comprises a total number of inputs and outputs for the file within a predetermined time interval, and a number of breaks of the inputs and outputs of the file.

14. The device according to claim 11, wherein the determination of the break rate comprises:

a monitoring, based on the SMB lease being determined not to be enabled, of a number of clients mapped to the file and a load state of the file; and the determination of the break rate based on the number of clients and the load state.

15. The device according to claim 14, wherein the number of clients mapped to the file comprises the number of clients connected to the file, and the load state of the file comprises an average number of input/output operations per second on the file within a predetermined time interval.

16. The device according to claim 14, wherein the load state of the file comes uniformly from clients at the number of clients.

17. The device according to claim 10, wherein the determining of the turning point of the break rate comprises:

a determination of a first total time consumption for acquisition of the file when not utilizing the SMB lease;

a determination of a second total time consumption for acquisition of the file when utilizing the SMB lease; and a determination of the turning point as a function of the first total time consumption being equal to the second total time consumption.

18. A computer program product, the computer program product being stored on a non-transitory computer readable medium and comprising computer executable instructions, wherein the computer executable instructions, when executed, cause a device to:

determine a break rate of a file serving as an object of a Server Message Block (SMB) lease in an SMB lease process;

determine a turning point of the break rate, wherein the turning point indicates a critical point between enabling the SMB lease and disabling the SMB lease; and determine whether to enable or disable the SMB lease based on the break rate and the turning point, wherein determining the turning point of the break rate comprises execution of the computer executable instructions to further cause the device to:

determine a first total time consumption for acquiring the file without utilizing the SMB lease;

determine a second total time consumption for acquiring the file when utilizing the SMB lease; and determine the turning point based on the first total time consumption being assumed to be equal to the second total time consumption.

19. The computer program product according to claim 18, wherein determination of whether to enable or disable the SMB lease based on the break rate and the turning point comprises execution of the computer executable instructions to cause the device to:

determine to disable the SMB lease based on the break rate being greater than the turning point, or determine to enable the SMB lease based on the break rate being less than or equal to the turning point.

20. The computer program product according to claim 18, wherein the computer executable instructions to further cause the device to:

determine whether the SMB lease has been enabled for the file, and determine the break rate based on a result of the determining whether the SMB lease has been enabled.

* * * * *